United States Patent [19]
Hauser et al.

[11] Patent Number: 5,889,956
[45] Date of Patent: Mar. 30, 1999

[54] HIERARCHICAL RESOURCE MANAGEMENT WITH MAXIMUM ALLOWABLE ALLOCATION BOUNDARIES

[75] Inventors: Stephen A. Hauser, Burlington, Mass.; Richard G. Bubenik, St. Louis, Mo.; Stephen A. Caldara, Sudbury; Thomas A. Manning, Northboro, both of Mass.

[73] Assignees: Fujitsu Network Communications, Inc., Richardson, Tex.; Fujitsu Limited, Kawasaki, Japan

[21] Appl. No.: 683,349

[22] Filed: Jul. 18, 1996

Related U.S. Application Data

[60] Provisional application No. 60/001,498, Jul. 19, 1995.
[51] Int. Cl.[6] ........................................ G06F 17/00
[52] U.S. Cl. ........................................ 395/200.56
[58] Field of Search ................ 395/200.56, 200.53, 395/200.59, 200.8, 200.79

[56] References Cited

U.S. PATENT DOCUMENTS

| | | | |
|---|---|---|---|
| 3,804,991 | 4/1974 | Hammond et al. | 179/26 |
| 3,974,343 | 8/1976 | Cheney et al. | 179/18 ES |
| 4,069,399 | 1/1978 | Barrett et al. | 179/15 AL |
| 4,084,228 | 4/1978 | Dufond et al. | 364/200 |
| 4,240,143 | 12/1980 | Besemer et al. | 364/200 |
| 4,603,382 | 7/1986 | Cole et al. | 364/200 |
| 4,715,030 | 12/1987 | Koch et al. | 370/85 |
| 4,727,537 | 2/1988 | Nichols | 370/85 |
| 4,737,953 | 4/1988 | Koch et al. | 370/94 |
| 4,748,658 | 5/1988 | Gopal et al. | 379/221 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |
| 4,849,968 | 7/1989 | Turner | 370/94 |
| 4,870,641 | 9/1989 | Pattavina | 370/60 |
| 4,872,157 | 10/1989 | Hemmady et al. | 370/60 |
| 4,872,159 | 10/1989 | Hemmady et al. | 370/60 |

(List continued on next page.)

OTHER PUBLICATIONS

An Ascom Timeplex White Paper, *Meeting Critical Requirements with Scalable Enterprise Networking Solutions Based on a Unified ATM Foundation*, pp. 1–12, Apr. 1994.

Douglas H. Hunt, *ATM Traffic Management –Another Perpective*, Business Communications Review, Jul. 1994.

Richard Bubenik et al., *Leaf Initiated Join Extensions*, Technical Committee, Signalling Subworking Group, ATM Forum/94–0325R1, Jul. 1, 1994.

Douglas H. Hunt et al., *Flow Controlled Virtual Connections Proposal for ATM Traffic Management (Revision R2)*, Traffic Management Subworking Group, ATM Forum/94–0632R2, Aug. 1994.

(List continued on next page.)

*Primary Examiner*—Ellis B. Ramirez
*Attorney, Agent, or Firm*—Weingarten, Schurgin, Gagnebin & Hayes LLP

[57] ABSTRACT

A system for managing resources such as buffers and bandwidth which are allocated to competing entities through two or more levels in a telecommunications network is disclosed. The system provides a tool to allocate resources for use by individual entities. Each entity may be assigned a Minimum_Guaranteed variable and a Maximum_Allowed variable. When an entity requests resources the system determines if the entity is using its respective minimum guaranteed resource allocation which is specified by the Minimum_Guaranteed variable. If the entity is not using its respective minimum guaranteed resource allocation, the system allocates a resource unit to the requesting entity. The system also allows a requesting entity to use additional resource units above the resource allocation specified by the Minimum_Guaranteed variable, provided such resource units are available. If the entity has reached its respective minimum guaranteed resource allocation, but has not reached the respective maximum allowed resource allocation specified by the Maximum_Allowed variable and no intervening level is using its respective maximum allowed resource allocation, then a resource unit is allocated to the requesting entity.

13 Claims, 5 Drawing Sheets

U.S. PATENT DOCUMENTS

| | | | |
|---|---|---|---|
| 4,872,160 | 10/1989 | Hemmady et al. | 370/60 |
| 4,872,197 | 10/1989 | Pemmaraju | 379/93 |
| 4,878,216 | 10/1989 | Yunoki | 370/60 |
| 4,893,302 | 1/1990 | Hemmady et al. | 370/60 |
| 4,893,307 | 1/1990 | McKay et al. | 370/94.1 |
| 4,894,824 | 1/1990 | Hemmady et al. | 370/58.3 |
| 4,897,833 | 1/1990 | Kent et al. | 370/85.2 |
| 4,897,841 | 1/1990 | Gang, Jr. | 370/85.13 |
| 4,899,333 | 2/1990 | Roediger | 370/60 |
| 4,920,531 | 4/1990 | Isono et al. | 370/60 |
| 4,922,503 | 5/1990 | Leone | 370/85.13 |
| 4,933,938 | 6/1990 | Sheehy | 370/85.13 |
| 4,942,574 | 7/1990 | Zelle | 370/85.15 |
| 4,947,390 | 8/1990 | Sheehy | 370/85.13 |
| 4,953,157 | 8/1990 | Franklin et al. | 370/60 |
| 4,956,839 | 9/1990 | Torii et al. | 370/60 |
| 4,958,341 | 9/1990 | Hemmady et al. | 370/60.1 |
| 4,979,100 | 12/1990 | Makris et al. | 364/200 |
| 4,993,018 | 2/1991 | Hajikano et al. | 370/60 |
| 5,014,192 | 5/1991 | Mansfield et al. | 364/200 |
| 5,021,949 | 6/1991 | Morten et al. | 364/200 |
| 5,029,164 | 7/1991 | Goldstein et al. | 370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,083,269 | 1/1992 | Syobatake et al. | 395/425 |
| 5,084,867 | 1/1992 | Tachibana et al. | 370/60 |
| 5,084,871 | 1/1992 | Carn et al. | 370/60 |
| 5,090,011 | 2/1992 | Fukuta et al. | 370/60 |
| 5,090,024 | 2/1992 | Mey et al. | 375/1 |
| 5,093,827 | 3/1992 | Franklin et al. | 370/60.1 |
| 5,093,912 | 3/1992 | Dong et al. | 395/650 |
| 5,115,429 | 5/1992 | Hluchyj et al. | 370/84 |
| 5,119,369 | 6/1992 | Tanabe et al. | 370/60 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/10 |
| 5,146,560 | 9/1992 | Goldberg et al. | 395/200 |
| 5,150,358 | 9/1992 | Punj et al. | 370/84 |
| 5,151,897 | 9/1992 | Suzuki | 370/85.13 |
| 5,157,657 | 10/1992 | Potter et al. | 370/85 |
| 5,163,045 | 11/1992 | Caram et al. | 370/60.1 |
| 5,163,046 | 11/1992 | Hahne et al. | 370/79 |
| 5,179,556 | 1/1993 | Turner | 370/94.1 |
| 5,179,558 | 1/1993 | Thacker et al. | 370/94.3 |
| 5,185,743 | 2/1993 | Murayama et al. | 370/110.1 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et al. | 370/94.1 |
| 5,198,808 | 3/1993 | Kudo | 340/825.8 |
| 5,199,027 | 3/1993 | Barri | 370/60 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60.1 |
| 5,257,311 | 10/1993 | Naito et al. | 380/48 |
| 5,258,979 | 11/1993 | Oomuro et al. | 370/95.1 |
| 5,265,088 | 11/1993 | Takigawa et al. | 370/15 |
| 5,267,232 | 11/1993 | Katsube et al. | 370/17 |
| 5,268,897 | 12/1993 | Komine et al. | 370/60 |
| 5,271,010 | 12/1993 | Miyake et al. | 370/94.1 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,280,469 | 1/1994 | Taniguchi et al. | 370/13 |
| 5,280,470 | 1/1994 | Buhrke et al. | 370/13 |
| 5,282,201 | 1/1994 | Frank et al. | 370/94.1 |
| 5,283,788 | 2/1994 | Morta et al. | 370/110.1 |
| 5,285,446 | 2/1994 | Yonehara | 370/60.1 |
| 5,287,349 | 2/1994 | Hyodo et al. | 370/60.1 |
| 5,287,535 | 2/1994 | Sakagawa et al. | 370/60 |
| 5,289,462 | 2/1994 | Ahmadi et al. | 370/60.1 |
| 5,289,463 | 2/1994 | Mobasser | 370/68.1 |
| 5,289,470 | 2/1994 | Chang et al. | 370/94.1 |
| 5,291,481 | 3/1994 | Doshi et al. | 370/79 |
| 5,291,482 | 3/1994 | McHarg et al. | 370/60 |
| 5,295,134 | 3/1994 | Yoshimura et al. | 370/16 |
| 5,301,055 | 4/1994 | Bagchi et al. | 359/139 |
| 5,301,184 | 4/1994 | Uriu et al. | 370/60 |
| 5,301,190 | 4/1994 | Tsukuda et al. | 370/60 |
| 5,301,193 | 4/1994 | Toyofuku et al. | 370/94.1 |
| 5,303,232 | 4/1994 | Faulk, Jr. | 370/94 |
| 5,305,311 | 4/1994 | Lyles | 370/60 |
| 5,309,431 | 5/1994 | Tominaga et al. | 370/60 |
| 5,309,438 | 5/1994 | Nakajima | 370/94.1 |
| 5,311,586 | 5/1994 | Bogart et al. | 379/221 |
| 5,313,454 | 5/1994 | Bustini et al. | 370/13 |
| 5,313,458 | 5/1994 | Suzuki | 370/56 |
| 5,315,586 | 5/1994 | Charvillat | 370/60 |
| 5,319,638 | 6/1994 | Lin | 370/60 |
| 5,321,605 | 6/1994 | Chapman et al. | 705/7 |
| 5,321,695 | 6/1994 | Proctor et al. | 370/60 |
| 5,323,389 | 6/1994 | Bitz et al. | 370/60.1 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/60 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita | 370/99 |
| 5,341,483 | 8/1994 | Frank et al. | 395/400 |
| 5,345,229 | 9/1994 | Olnowich et al. | 340/825.8 |
| 5,350,906 | 9/1994 | Brody et al. | 235/379 |
| 5,355,372 | 10/1994 | Sengupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Bouded et al. | 370/58.3 |
| 5,357,510 | 10/1994 | Norizuki et al. | 370/60.1 |
| 5,359,600 | 10/1994 | Ueda et al. | 370/60.1 |
| 5,361,251 | 11/1994 | Aihara et al. | 370/60 |
| 5,361,372 | 11/1994 | Rege et al. | 395/800 |
| 5,363,433 | 11/1994 | Isono | 379/92 |
| 5,363,497 | 11/1994 | Baker et al. | 395/425 |
| 5,369,570 | 11/1994 | Parad | 364/401 |
| 5,371,893 | 12/1994 | Price et al. | 395/725 |
| 5,373,504 | 12/1994 | Tanaka et al. | 370/60.1 |
| 5,375,117 | 12/1994 | Morita et al. | 370/79 |
| 5,377,262 | 12/1994 | Bales et al. | 379/220 |
| 5,377,327 | 12/1994 | Jain et al. | 395/200 |
| 5,379,297 | 1/1995 | Glover et al. | 370/60.1 |
| 5,379,418 | 1/1995 | Shimazaki et al. | 395/575 |
| 5,390,170 | 2/1995 | Sawant et al. | 370/58.1 |
| 5,390,174 | 2/1995 | Jugel | 370/60 |
| 5,390,175 | 2/1995 | Hiller et al. | 370/60 |
| 5,392,280 | 2/1995 | Zheng | 370/60 |
| 5,392,402 | 2/1995 | Robrock, II | 395/200 |
| 5,394,396 | 2/1995 | Yoshimura et al. | 370/60 |
| 5,394,397 | 2/1995 | Yanagi et al. | 370/60.1 |
| 5,398,235 | 3/1995 | Tsuzuki et al. | 370/16 |
| 5,400,337 | 3/1995 | Munter | 370/60.1 |
| 5,402,415 | 3/1995 | Turner | 370/60 |
| 5,412,648 | 5/1995 | Fan | 370/60 |
| 5,414,703 | 5/1995 | Sakaue et al. | 370/60 |
| 5,418,942 | 5/1995 | Krawchuk et al. | 395/600 |

| | | | |
|---|---|---|---|
| 5,420,858 | 5/1995 | Marshall et al. | 370/60.1 |
| 5,420,988 | 5/1995 | Elliott | 395/275 |
| 5,422,879 | 6/1995 | Parsons et al. | 370/60 |
| 5,425,021 | 6/1995 | Derby et al. | 370/54 |
| 5,425,026 | 6/1995 | Mori | 370/60 |
| 5,426,635 | 6/1995 | Mitra et al. | 370/60 |
| 5,432,713 | 7/1995 | Takeo et al. | 364/514 |
| 5,432,784 | 7/1995 | Ozveren | 370/79 |
| 5,432,785 | 7/1995 | Ahmed et al. | 370/79 |
| 5,432,908 | 7/1995 | Heddes et al. | 395/250 |
| 5,436,886 | 7/1995 | McGill | 370/16 |
| 5,436,893 | 7/1995 | Barnett | 370/60.1 |
| 5,440,547 | 8/1995 | Easki et al. | 370/60 |
| 5,444,702 | 8/1995 | Burnett et al. | 370/60.1 |
| 5,446,733 | 8/1995 | Tsuruoka | 370/60.1 |
| 5,446,737 | 8/1995 | Cidon et al. | 370/85.5 |
| 5,446,738 | 8/1995 | Kim et al. | 370/94.2 |
| 5,448,559 | 9/1995 | Hayter et al. | 370/60.1 |
| 5,448,621 | 9/1995 | Knudsen | 379/58 |
| 5,450,406 | 9/1995 | Esaki et al. | 370/60.1 |
| 5,452,296 | 9/1995 | Shimizu | 370/60.1 |
| 5,454,299 | 10/1995 | Thessin et al. | 370/62 |
| 5,455,820 | 10/1995 | Yamada | 370/17 |
| 5,455,825 | 10/1995 | Lauer et al. | 370/60 |
| 5,457,687 | 10/1995 | Newman | 370/85.3 |
| 5,459,743 | 10/1995 | Fukuda et al. | 371/67.1 |
| 5,461,611 | 10/1995 | Drake Jr. et al. | 370/54 |
| 5,463,620 | 10/1995 | Sriram | 370/60 |
| 5,463,629 | 10/1995 | Ko | 370/110.1 |
| 5,463,775 | 10/1995 | DeWitt et al. | 395/184.01 |
| 5,465,331 | 11/1995 | Yang et al. | 395/200.08 |
| 5,465,365 | 11/1995 | Winterbottom | 395/600 |
| 5,469,003 | 11/1995 | Kean | 326/39 |
| 5,473,608 | 12/1995 | Gagne et al. | 370/85.13 |
| 5,475,679 | 12/1995 | Munter | 370/58.2 |
| 5,479,401 | 12/1995 | Bitz et al. | 370/60.1 |
| 5,479,402 | 12/1995 | Hata et al. | 370/60.1 |
| 5,483,526 | 1/1996 | Ben-Nun et al. | 370/60.1 |
| 5,485,453 | 1/1996 | Wahlman et al. | 370/16 |
| 5,485,455 | 1/1996 | Dobbins et al. | 370/60 |
| 5,487,063 | 1/1996 | Kakuma et al. | 370/56 |
| 5,488,606 | 1/1996 | Kakuma et al. | 370/16 |
| 5,491,691 | 2/1996 | Shtayer et al. | 370/61 |
| 5,491,694 | 2/1996 | Oliver et al. | 370/85.4 |
| 5,493,566 | 2/1996 | Ljungberg et al. | 370/60 |
| 5,497,369 | 3/1996 | Wainwright | 370/60 |
| 5,499,238 | 3/1996 | Shon | 370/60.2 |
| 5,504,741 | 4/1996 | Yamanaka et al. | 370/58.2 |
| 5,504,742 | 4/1996 | Kakuma et al. | 370/60.1 |
| 5,506,834 | 4/1996 | Sekihata et al. | 370/17 |
| 5,506,839 | 4/1996 | Hatta | 370/60 |
| 5,506,956 | 4/1996 | Cohen | 395/182.04 |
| 5,509,001 | 4/1996 | Tachibana et al. | 370/17 |
| 5,509,007 | 4/1996 | Takashima et al. | 370/60.1 |
| 5,513,134 | 4/1996 | Cooperman et al. | 365/49 |
| 5,513,178 | 4/1996 | Tanaka | 370/58.2 |
| 5,513,180 | 4/1996 | Miyake et al. | 370/60.1 |
| 5,515,359 | 5/1996 | Zheng | 370/13 |
| 5,517,495 | 5/1996 | Lund et al. | 370/60 |
| 5,519,690 | 5/1996 | Suzuka et al. | 370/17 |
| 5,521,905 | 5/1996 | Oda et al. | 370/17 |
| 5,521,915 | 5/1996 | Dieudonne et al. | 370/60.1 |
| 5,521,916 | 5/1996 | Choudhury et al. | 370/60.1 |
| 5,521,917 | 5/1996 | Watanabe et al. | 370/1 |
| 5,521,923 | 5/1996 | Willmann et al. | 370/94.1 |
| 5,523,999 | 6/1996 | Takano et al. | 370/58.2 |
| 5,524,113 | 6/1996 | Gaddis | 370/60.1 |
| 5,526,344 | 6/1996 | Diaz et al. | 370/16 |
| 5,528,588 | 6/1996 | Bennett et al. | 370/60 |
| 5,528,590 | 6/1996 | Iidaka et al. | 370/60.1 |
| 5,528,591 | 6/1996 | Lauer | 370/79 |
| 5,530,695 | 6/1996 | Dighe et al. | 370/17 |
| 5,533,009 | 7/1996 | Chen | 370/17 |
| 5,533,020 | 7/1996 | Byrn et al. | 370/60.1 |
| 5,535,196 | 7/1996 | Aihara et al. | 370/60 |
| 5,535,197 | 7/1996 | Cotton | 370/60 |
| 5,537,394 | 7/1996 | Abe et al. | 370/17 |
| 5,541,912 | 7/1996 | Choudhury et al. | 370/17 |
| 5,544,168 | 8/1996 | Jeffrey et al. | 370/60.1 |
| 5,544,169 | 8/1996 | Norizuki et al. | 370/60.1 |
| 5,544,170 | 8/1996 | Kasahara | 370/84 |
| 5,546,389 | 8/1996 | Wippenbeck et al. | 370/60 |
| 5,546,391 | 8/1996 | Hochschild et al. | 370/60 |
| 5,546,392 | 8/1996 | Boal et al. | 370/60.1 |
| 5,550,821 | 8/1996 | Akiyoshi | 370/60.1 |
| 5,550,823 | 8/1996 | Irie et al. | 370/60.1 |
| 5,553,057 | 9/1996 | Nakayama | 370/13 |
| 5,553,068 | 9/1996 | Aso et al. | 370/60 |
| 5,555,243 | 9/1996 | Kakuma et al. | 370/58.2 |
| 5,555,265 | 9/1996 | Kakuma et al. | 370/60 |
| 5,557,607 | 9/1996 | Holden | 370/58.2 |
| 5,568,479 | 10/1996 | Watanabe et al. | 370/60.1 |
| 5,570,361 | 10/1996 | Norizuki et al. | 370/60.1 |
| 5,570,362 | 10/1996 | Nishimura | 370/60.1 |
| 5,572,522 | 11/1996 | Calamvokia et al. | 370/60.1 |
| 5,577,032 | 11/1996 | Sone et al. | 370/58.3 |
| 5,577,035 | 11/1996 | Hayter et al. | 370/60 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,623,405 | 4/1997 | Isono | 395/230 |
| 5,625,846 | 4/1997 | Kobayakawa et al. | 395/872 |
| 5,633,861 | 5/1997 | Hanson et al. | 370/232 |
| 5,640,569 | 6/1997 | Miller et al. | 395/729 |
| 5,682,530 | 10/1997 | Shimamura | 395/674 |
| 5,719,854 | 2/1998 | Choudhury et al. | 370/231 |

OTHER PUBLICATIONS

Flavio Bonomi et al., *The Rate–Based Flow Control Framework for the Available Bit Rate ATM Service*, IEEE Network, Mar./Apr. 1995, pp. 25–39.

R. Jain, *Myths About Congestion Management in High Speed Networks*, Internetworking Research and Experience, vol. 3, 101–113 (1992).

Douglas H. Hunt et al., *Credit–Based FCVC Proposal for ATM Traffic Management (Revision R1)*, ATM Forum Technical Committee Traffic Management Subworking Group, ATM Forum/94–0168R1, Apr. 28, 1994.

Douglas H. Hunt et al., *Action Item Status for Credit–Based FCVC Proposal*, ATM Forum Technical Committee Traffic Management Subworking Group, ATM Forum/94–0439, Apr. 28, 1994.

Timothy P. Donahue et al., *Arguments in Favor of Continuing Phase 1 as the Initial ATM Forum P–NNI Routing Protocol Implementation*, ATM Forum Technical Committee, ATM Forum/94–0460, Apr. 28,1994.

Richard Bubenick et al., *Leaf Initiated Join Extensions*, Technical Committee, Signalling Subworking Group, ATM Forum/94–0325, Apr. 28, 1994.

Rob Coltun et al., *PRP: A P–NNI Routing Protocol Proposal*, ATM Forum Technical Committee, ATM Forum/94–0492, Apr. 28, 1994.

Richard Bubenik et al., *Leaf Initiated Join Extensions*, ATM Forum Technical Committee, Signalling Subworking Group, ATM Forum 94–0325, Apr. 28, 1994.

Richard Bubenik et al., *Requirements For Phase 2 Signaling Protocol*, ATM Forum Technical Committee, Signalling Subworking Group, ATM Forum 94–1078, Jan. 1, 1994.

SITA, ATM RFP: C–Overall Technical Requirements, Sep. 1994.

H.T. Kung and K. Chang, *Receiver–Oriented Adaptive Buffer Allocation in Credit–Based Flow Control for ATM Networks*, Proceedings of INFOCOM '95, Apr. 2–6, 1995, pp. 1–14.

H.T. Kung, et al., *Credit–Based Flow Control for ATM Networks: Credit Update Protocol, Adaptive Credit Alloca and Statistical Multiplexing*, Proceedings of ACM SIG-COMM '94 Symposium on Communications Architectures, Protocols and Applications, Aug. 31–Sep. 2, 1994, pp. 1–14.

*Head of Line Arbitration in ATM Switches with Input–Output Buffering and Backpressure Control.* By Hosein F. Badran and H.T. Mouftah, *Globecom* '91, pp. 0347–0351.

5,889,956

HIERARCHICAL RESOURCE MANAGEMENT WITH MAXIMUM ALLOWABLE ALLOCATION BOUNDARIES

FIELD OF THE INVENTION

The present invention is generally related to resource management techniques and more particularly to resource management techniques which dynamically adjust to conditions at multiple levels to provide efficient use of resources in a telecommunications network.

RELATED APPLICATION

A claim of priority is made to provisional application Ser. No. 60/001,498 entitled COMMUNICATION METHOD AND APPARATUS, filed Jul. 19, 1995.

BACKGROUND OF THE INVENTION

Basic techniques for management of finite resources such as bandwidth and buffers in multiple level hierarchical systems such as asynchronous transfer mode ("ATM") networks are generally known. The techniques include provision of sufficient resources to satisfy theoretical maximum demands and allocation of resources based on statistically calculated demands.

Trying to provide sufficient resources for theoretical maximum demands is costly and inefficient. The technique is costly because the hardware which comprises the resources is costly. The technique is inefficient because actual use is typically considerably less than the theoretical maximum, and a portion of the provided resources are thus under-utilized.

On the other hand, allocation of resources at one level of a hierarchical system of resources based upon an expectation of how much resource may be required under some given set of conditions may improve efficiency and reduce the cost of resources. The current state of the art for hierarchical systems must attempt this on the basis of requests specifying either a maximum or a nominal resource requirement. Resources are granted based upon some statistical basis. However, this technique lacks the control and flexibility required to manage the resources in an effective manner at the various levels of the hierarchy. Several unsatisfactory modes of operation are experienced. The resources granted may not be sufficient to satisfy the requirements under all conditions and as a result, the required resources may not be available when needed and data is lost. The granting of excess resources, while aiding in the prevention of data loss, nullifies the cost savings that can be realized. Such systems do not provide a means to manage the hierarchical resources in a dynamic manner to accommodate changing conditions. Furthermore, such systems do not allow for the maintenance of a pool of resources that may be shared in a controlled manner by all of the requesters at the immediately lower level of the hierarchical resources.

The provisioning of resources for hierarchical services under the current state of the art is accomplished by a request from the lower level to the next higher level for a specific amount of resource. The basis of granting this request may be either in terms of a maximum requirement or as a statistical expectation of the resource that will be required. Resources so granted may prove inefficient or may provide unsatisfactory performance. Once granted, however, changes in this assignment of resources may be quite difficult to effect since they will typically involve negotiations and changes to the resources provided by the higher level to the other peer lower level users of the resources.

SUMMARY OF THE INVENTION

Allocation of resources is governed by resource usage levels associated with resource using entities: a maximum allowed usage level and a minimum guaranteed usage level. A method of hierarchical resource management for allocation of resource units to a level 0 entity from a level N entity and intervening levels, where N is greater than or equal to two, includes: assigning a first variable to one or more entities specifying a maximum amount of resource to be allocated to the respective entity; and processing a request from the level 0 entity for a resource unit by: determining whether actual use by the level 0 entity is less than the allocation specified by the assigned first variable, provided a first variable is assigned to the level 0 entity, and denying the request if actual use is not less than the allocation specified by the assigned first variable, otherwise; determining whether actual use at each intervening level is less than the allocation specified by the assigned first variable at such level, provided the first variable is so assigned, and denying the request if actual use is not less than the allocation specified by the assigned first variable at any intervening level, otherwise; providing a resource unit to the level 0 entity. A second variable specifying the minimum guaranteed resource allocation may also be assigned to each respective entity. Requests for resources by an entity are granted if the requested utilization level is less than the minimum guaranteed resource allocation.

The first and second variables provide a tool for maximizing overall resource utilization by controlling resource utilization by individual entities in a manner which was not previously possible. Efficient, flexible, controlled use of resources is provided by ensuring that each entity has at least its respective minimum guaranteed resource allocation and by allowing entities to use available resources in excess of their respective minimum guaranteed allocations, up to the amount specified by the first variable. When a level 0 entity requests a resource unit, that resource unit is provided if actual use by the level 0 entity is less than the assigned minimum guaranteed amount specified by the second variable. A policy can then be implemented to assure availability of the minimum guaranteed resource allocation by ensuring that the minimum guaranteed amount available at one level is greater than or equal to the sum of all minimum provided amounts at the level below. Once the entity has been allocated its respective minimum guaranteed amount of resource, additional available resource may be utilized up to the amount specified by the respective first variable. Hence, overall resource utilization, and thus efficiency, are maximized by controlling resource utilization by individual entities.

With respect to the provisioning of resources in hierarchical structures, this invention provides a superior service to that of the previous art. Requests for resources are now made in terms of two variables: one specifying the maximum resource that this requester could use (the maximum allowed), the other specifying the minimum resource that is required by this requester. The basis of granting a request is the availability of the minimum resource. If additional resources are available, then the requester will be allowed to use up to the maximum allowed. The higher level must be able to provide resources equal to the sum of the minimum resource requirements for the requests that have been granted. The service provided to the lower level users by the higher level may be improved by having resources available up to the sum of the maximum allowed for all the lower level requests that have been granted. Furthermore, it is also made clear that there is no additional benefit to be gained by supplying resources above the sum of the maximum allowed of all the granted requests. A similar method of requesting and granting of resources would be employed at each level of a hierarchical system of resources. Thus this invention allows resources to be assigned and used more effectively and efficiently at each level of a hierarchical system than would otherwise be possible.

In an alternative embodiment, the minimum guaranteed resources are statistically shared among resources using entities at higher levels of the resource hierarchy. When the minimum guaranteed portion is statistically shared, the method is modified to implement statistical sharing policies. More particularly, if the level 0 entity is operating below the associated minimum guaranteed resource allocation, then the entity can use resources above the respective minimum guaranteed resource allocations at higher levels. This policy allows entities to continue using resources even if the pool of minimum guaranteed resources has been consumed. Additionally, if the level 0 entity is operating above the associated minimum guaranteed resource allocation, the resources at higher levels are granted only if there are minimum guaranteed resources at all higher levels. This policy leaves resources available for other entities that have not consumed their associated minimum guaranteed resources. Such statistical sharing is advantageous when, for example, there are numerous resource users which will not all request resources at the same time.

BRIEF DESCRIPTION OF THE DRAWING

Other features and advantages will become apparent in light of the following detailed description of the drawing in which.

DETAILED DESCRIPTION OF THE DRAWING

Figure 1:
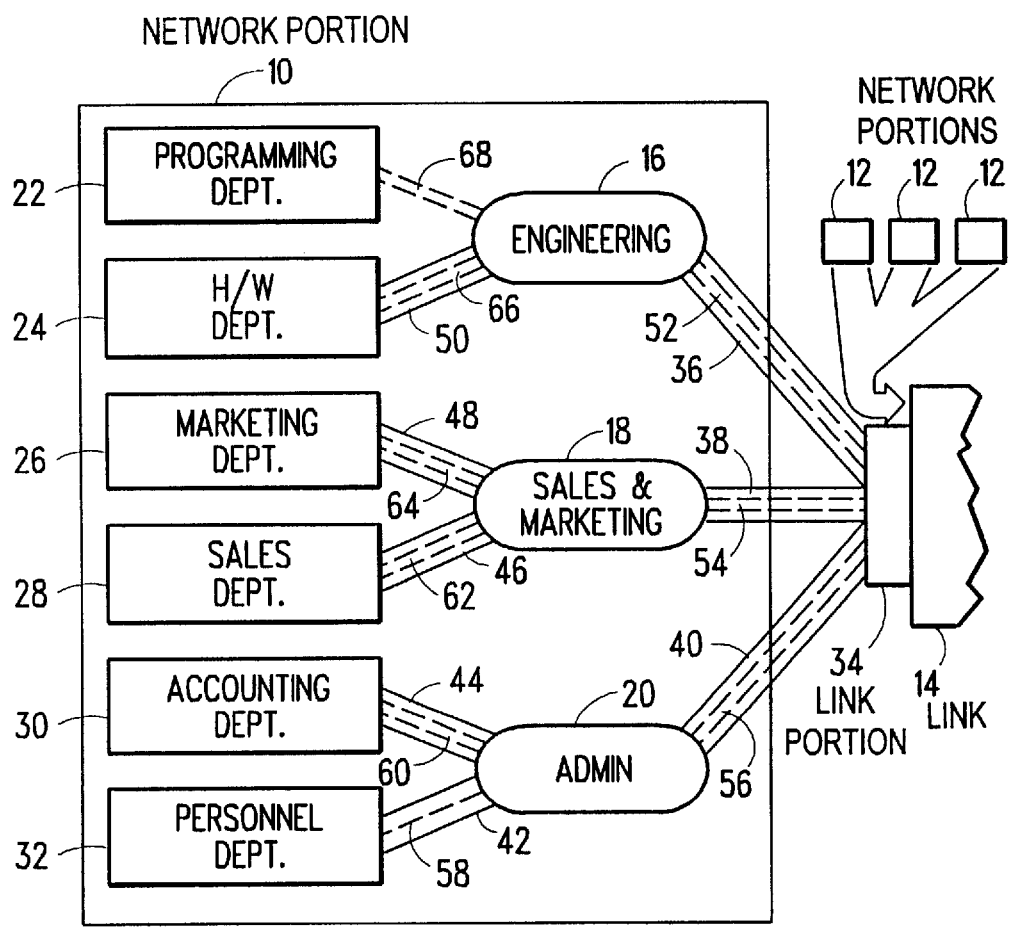
FIG. 1 illustrates bandwidth allocation in a telecommunications network.

FIG. 1 illustrates bandwidth allocation in a telecommunications network. The network portion 10 illustrates an entity requiring network bandwidth, such as a company. The network portion 10 may share bandwidth with other network portions 12 on a fiber-optic or other link 14. The network portion 10 by way of example may represent the network portion within a company and in the present example includes a number of other entities requiring access to network bandwidth such as an engineering group 16, a sales and marketing group 18, and administration group 20, a programming department 22, a hardware department 24, a marketing department 26, a sales department 28, an accounting department 30 and a personnel department 32. For explanatory purposes, the link 14 can provide a maximum of 200 million bits per second ("MBPS") of bandwidth. It will be appreciated that if each of the network portions 10, 12 in the network are allowed to appropriate bandwidth without restraint, some users may appropriate much more bandwidth than others, and some users may get too little or no bandwidth.

Control of overall bandwidth utilization is provided by controlling bandwidth utilization at the company, group and department levels. The company link portion 34 in the present example is limited to a maximum of 100 MBPS of bandwidth. That is, once 100 MBPS of bandwidth is utilized in the link 34 the network prevents entities within the company from obtaining additional bandwidth through the link 34. Similarly, in the present example the engineering group is limited to 70 MBPS of bandwidth 36 and the hardware department is limited to 30 MBPS of bandwidth 50. The programming department 22 is not directly limited to a bandwidth. However, it is not necessary to impose a bandwidth limitation on every department and/or group. While the programming department has no direct bandwidth limit in this example, the programming department is still limited by the engineering group bandwidth allocation 36. That is, the bandwidth use by the departments within a group cannot exceed the bandwidth allocation for the group. It should also be noted that a department is not guaranteed access to the respective maximum bandwidth associated with that department.

Further control over bandwidth allocation is provided by assigning a minimum guaranteed amount of bandwidth to be provided to the bandwidth utilizing entities such as companies, groups and departments, etc. The company in the present example has a minimum guaranteed bandwidth in the link 34 of 100 MBPS, the engineering group has a minimum guaranteed bandwidth through link 52 of 60 MBPS, the hardware department has a minimum guaranteed bandwidth through link 66 of 25 MBPS, and the programming department has a minimum guaranteed bandwidth through link 68 of 35 MBPS. In order to provide certainty of access to the minimum guaranteed bandwidth for respective entities within the network, the system may be structured such that the minimum guaranteed bandwidth provided to the company is equal to the sum of the minimum guaranteed bandwidths of the groups, and the sum of the minimum guaranteed bandwidths of the groups is equal to the sum of the minimum guaranteed bandwidths of the departments. Further, the minimum guaranteed bandwidth provided to some entities may be set to zero.

Figure 2:
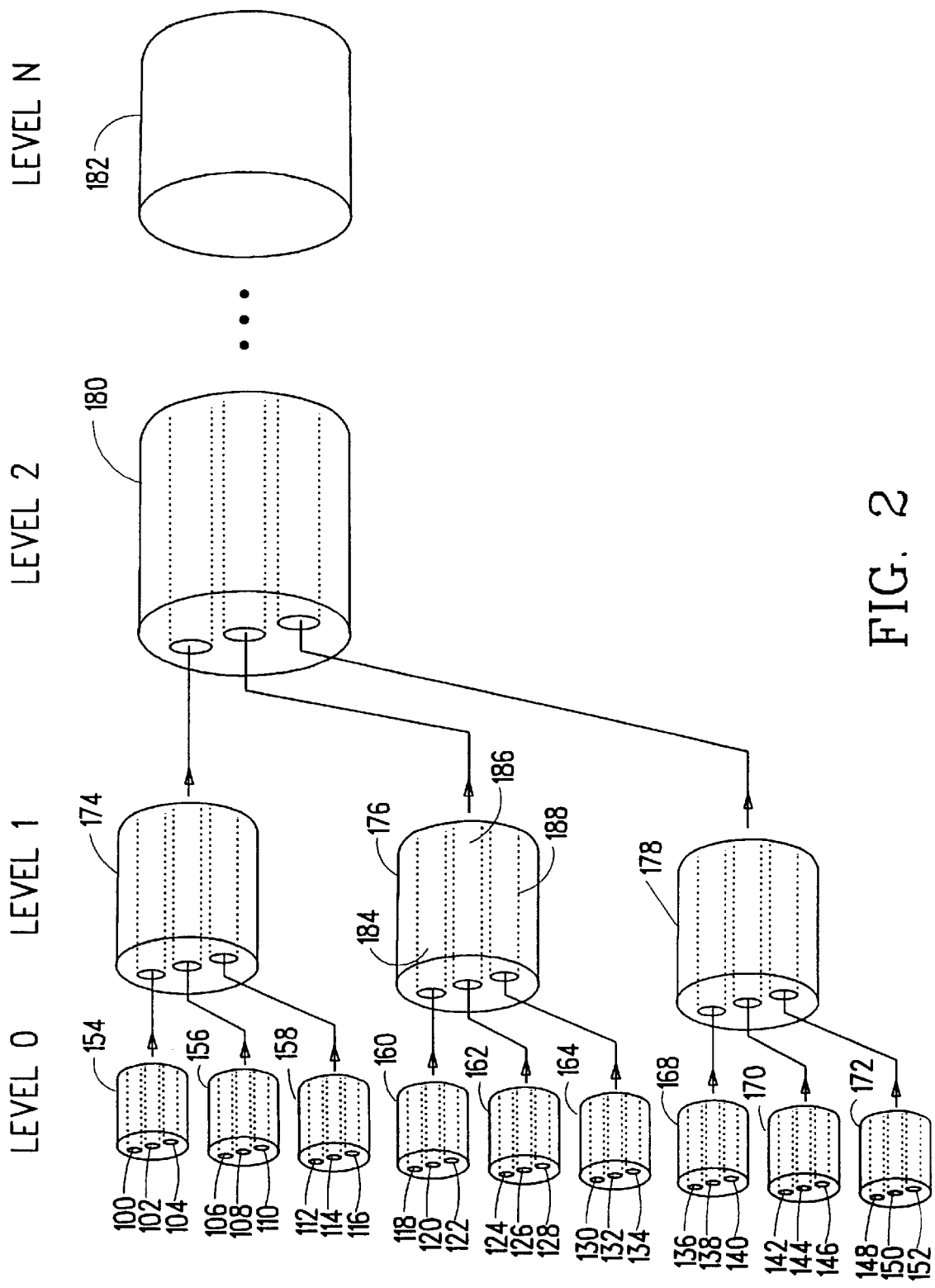
FIG. 2 illustrates multiple level resource management.

FIG. 2 illustrates resource management on N levels, where $N \geq 2$. Twenty seven basic resource utilizing entities 100–152 exist within level 0 entities. Nine entities 154–172 exist at level 0. The level 0 entities exist within level 1 entities 174, 176, 178, which exist within a level 2 entity 180. The architecture continues to a level N entity 182 in which all lower level entities exist. For example, entity 122 exists within level 0 entity 160, which exists within level 1 entity 176, etc. Resources are allocated to the basic entities through the level N entities and intervening entities. As such, the total amount of resources which can be allocated to the basic entity is limited by the amount of resources which can be provided by the level 0 to level N entities.

Each entity in the architecture may optionally be assigned one or both of two variables which determine resource allocation to that entity: Minimum_Guaranteed and Maximum_Allowed. For each level illustrated, the area enclosed by dashed lines represents the Minimum_Guaranteed resource allocation which can be supplied to the next lower level. The sum of the Minimum_Guaranteed resource allocations at a given level is equal to the Minimum_Guaranteed resource allocation of that level. For example, the Minimum_Guaranteed resource allocation at level 1 for entity 176 is equal to the sum of allocations 184, 186, 188. Open area at each level represents additional bandwidth available above the Minimum_Guaranteed allocation. The actual current amount of resource utilized ("actual use") by an entity is greater than or equal to zero, and less than or equal to Maximum_Allowed. The basic operational rules of the management system are: (1) an entity may not utilize more resources than the assigned Maximum_Allowed amount; and (2) each entity is assured of being provided with the Minimum_Guaranteed amount, although a Minimum_Guaranteed amount of "0" may be specified.

The system advantageously allocates resources to a requesting entity based on availability of resources at the intervening levels. If the resource utilizing entity is utilizing less than the assigned Minimum_Guaranteed resource allocation, the request for resources is granted. However, when a request is made for, allocation of resources in excess of Minimum_Guaranteed, resource availability at intervening levels 1 to N is determined based on assigned Minimum_Guaranteed and Maximum_Allowed variables. If a resource unit is not available at an intervening level because the entity at that level has reached the assigned Maximum_Allowed resource allocation, the request for a resource unit at level 0 is denied. If a resource unit is available at each intervening level, the request is granted.

Figure 3:
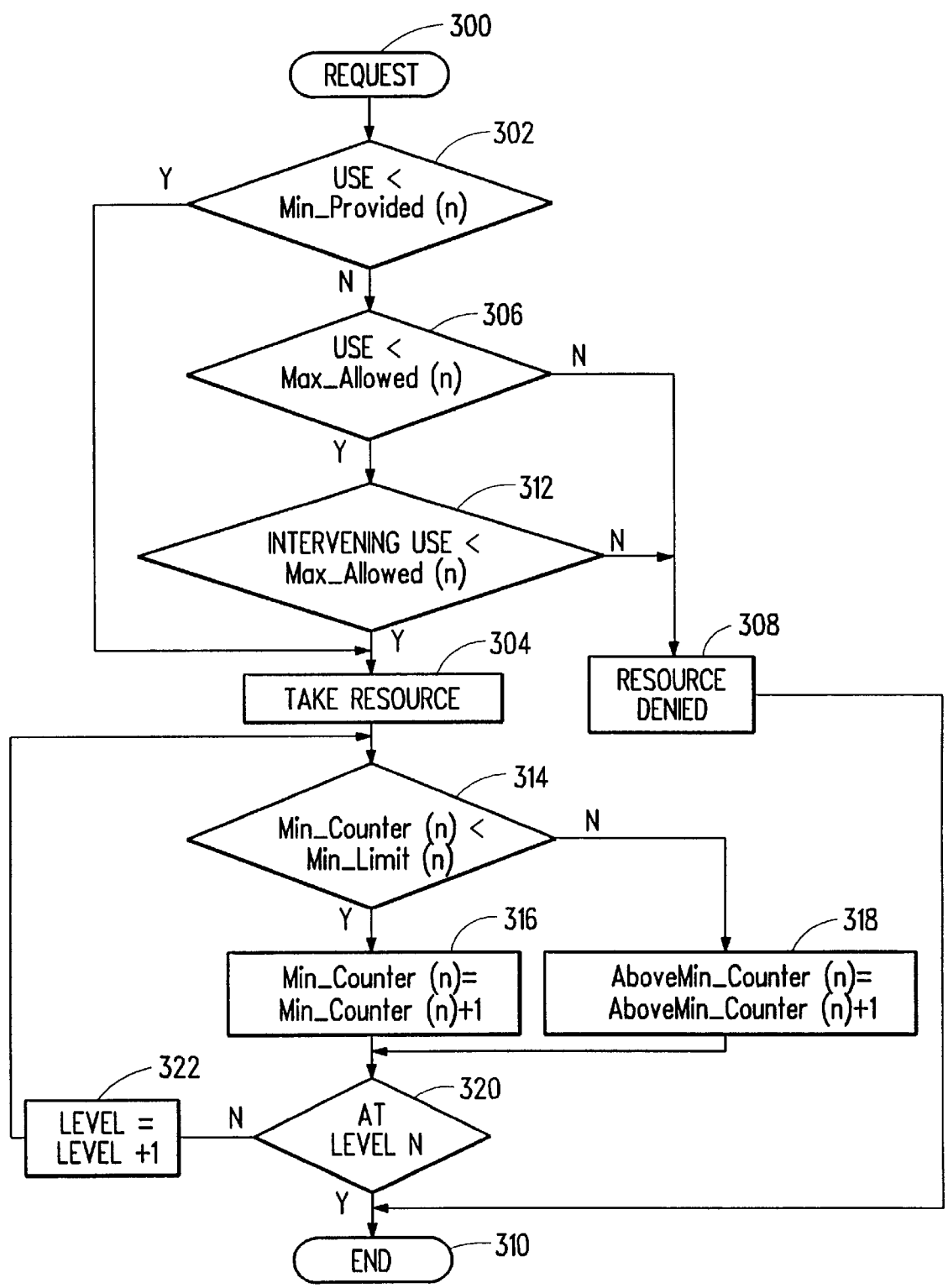
FIG. 3 is a flow chart of a method for consuming a resource.

FIG. 3 is a flow chart which illustrates enqueuing under the resource management system. When a level 0 entity first requests 300 a resource unit, a query 302 is made to determine whether actual use by the level 0 entity is less than the respective Minimum_Guaranteed variable. If the actual use is less than Minimum_Guaranteed variable then a resource unit is allocated 304. If the actual use is not less than the respective Minimum_Guaranteed variable, a query 306 is made to determine whether the actual use is less than Maximum_Allowed for that entity. If the actual use is greater than or equal to the respective Maximum_Allowed variable then the request is denied 308 and enqueuing terminates 310. If the actual use is less than the respective Maximum_Allowed variable then a query 312 is made to determine whether a resource unit is available to the intervening level entities through which the resource unit would be allocated to the level 0 entity. That is, query 312 determines whether actual use is less than the respective Maximum_Allowed variable at each intervening level. If actual use is not less than the respective Maximum_Allowed variable at each intervening level then the resource unit request is denied 308. If actual use is less than the respective Maximum_Allowed variable at each intervening level, the resource unit is allocated 304 to the level 0 entity and variables which track resource use are updated accordingly.

In order to track resource use for allocation purposes each entity is assigned a Min_Limit variable, an AboveMin_Limit variable, a Min_Counter and an AboveMin_Counter. Min_Limit is used to limit the total Minimum_Guaranteed resources the entity can use. AboveMin_limit is used to limit the total resources which the entity can use in excess of Minimum_Guaranteed. The Maximum_Allowed number of resources an entity can use is equal to the sum of Min_Limit and AboveMin_Limit. Min_Counter counts the number of resource units in use by an entity up to Min_Limit. AboveMin_Counter counts the number of resource units in use by an entity in excess of Min_Limit. In practice, Min_Counter is incremented as resource units are taken by the entity until Min_Limit is reached, and AboveMin_Counter is incremented as resource units are taken by the entity between Min_Limit and AboveMin_Limit.

To update the counters when a resource unit has been allocated the management system first determines whether the level 0 entity Min_Counter variable is less than the Min_Limit variable in a query 314. If the Min_Counter variable is less than the Min_Limit variable, the Min_Counter variable is incremented 316. If the Min_Counter variable is not less than the Min_Limit variable, the AboveMin_Counter variable is incremented 318. The system then determines whether level N has been reached in query 320. If level N has not been reached then the system examines the next higher level 322 and updates the counters accordingly. When level N is reached the program terminates 310.

Figure 4:
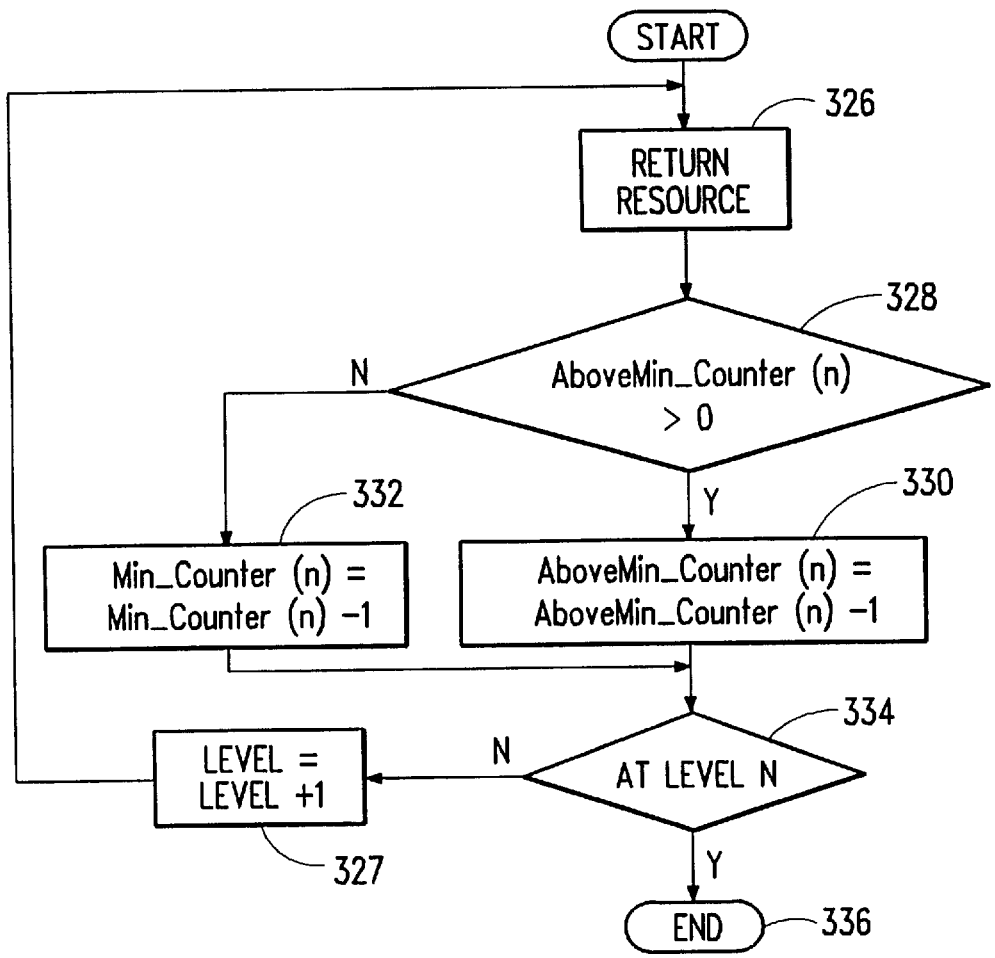
FIG. 4 is a flow chart of a method for freeing a resource.

Referring now to FIG. 4, resources which are no longer in use are dequeued. In dequeuing, a resource unit is returned in step 326 and the counters are updated. The counters are updated by first decrementing the respective AboveMin_Counter variable to zero and then decrementing the respective Min_Counter variable. More particularly, when a resource unit is returned the management system first determines if the respective AboveMin_Counter variable is greater than zero in query 328. If the AboveMin_Counter variable is greater than zero then AboveMin_Counter variable is decremented 330, otherwise the respective Min_Counter variable is decremented 332. The system then determines whether level N has been reached in query 334. If level N has not been reached then the system examines the next higher level 327 and updates the counters accordingly. When level N is reached the program terminates 336.

Figure 5:
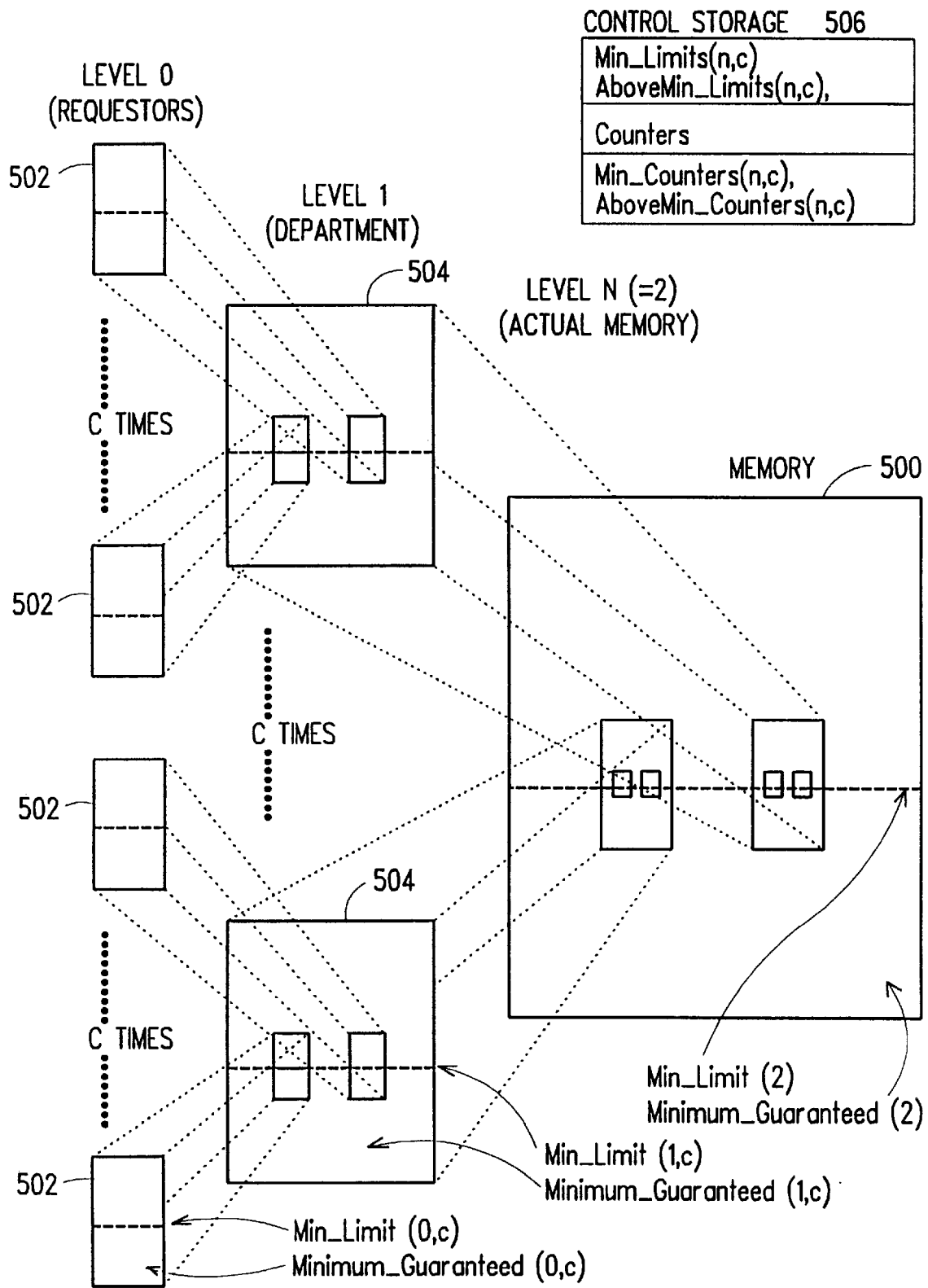
FIG. 5 is a block diagram which illustrates hierarchical memory management.

FIG. 5 illustrates a memory managed in a hierarchical manner. The actual memory 500 is shown at right. The memory is level 2 of a three level hierarchy. The requesters 502, at level 0 of the hierarchy, are shown at the left. Requesters are grouped by departments 504 at level 1 of the hierarchy. There may be many requesters per department, but for clarity only two are shown. Further, when necessary for clarity some levels are denoted by "n" and requesters are denoted by "c", as in Min_Limit (n,c), which for n=1 and c=6 denotes the Min_Limit value for department number 6.

The hierarchical memory management system includes Control Storage 506 to store all the Min_Limit values, AboveMin_Limit values and counters corresponding to all the Min_Counter and AboveMin_Counter values that are required. In each case the number of these values required is defined by the number of levels and the number of peer requesters at each level.

The actual memory 500 contains a fixed number of memory locations. These locations are divided into two pools of memory based on the Min_Limit(2). Memory elements below the Min_Limit represent the minimum guaranteed memory resource available at level 2. The total memory elements shown including those above the Min_Limit represent the maximum allowable memory resource available. Memory elements corresponding to the minimum guaranteed resource available are depicted as being adjacent to one another with the dividing line for the Min_Limit being a horizontal line, but there is no requirement that this be the case. Memory elements corresponding to the minimum guaranteed resource may be distributed throughout the actual memory 500, with the number of memory elements used in both categories held in corresponding counters and the Min_Limit value held in a corresponding control storage location. The maximum allowable memory resource, depicted by the outline of the rectangle designated Memory, is equal to the number of memory elements available, which is a fixed predetermined number based on the physical memory itself. The value for Min_Limit may be assigned, changed and managed, based upon the requirements of the controlling system.

At level 1 the minimum guaranteed memory resource available and the maximum allowable memory resource available for each of the requesters are similarly depicted. Again these values are held in counters and control storage locations. However, at level 1 all values may be assigned, changed and managed, based upon the requirements of the controlling system.

At level 0 the minimum guaranteed memory resource available and the maximum allowable memory resource available for each of the requestors are similarly depicted. Again these values are held in counters and control storage locations. At level 0 all values may be assigned, changed and managed, based upon the requirements of the controlling system.

As depicted, the memory elements granted to a requester are shown as a contiguous block of memory at level 0, level 1 and level 2, with the Min_Limits aligning with the horizontal line depicting the Min_Limit at the next higher level. However, in actual usage the memory elements granted could be spread throughout the memory. In all cases, counters and control storage control and track the actual assignment of memory elements to a requester. The AboveMin_Limit at level 2, AboveMin_Limit(2), exactly correspond to the total actual memory available less the guaranteed minimum, Min_Limit(2). At levels 0 and 1 each of the values of the maximum memory resources available, AboveMin_Limit(n,c), are set based both upon the actual memory resources available at level 2 and the requirements of the controlling system.

A request for a memory resource by a requester at level 0 is processed based upon the flow provided in FIG. 3, with the current usage at level 0, level 1 and level 2 and the flow of FIG. 3 determining whether the request will be granted or rejected. if granted, the requester will be allowed to use the requested memory in the actual memory at level 2. The return of the requested memory to available status is controlled by the flow shown in FIG. 4.

The sum of the minimum guaranteed memory resources for the requesters at level 0 belonging to one of the departments may exactly equal the minimum guaranteed memory resource for that department at level 1. Similarly, the sum of the minimum guaranteed memory resources at level 1 for all of the departments may exactly equal the minimum guaranteed memory resource at level 2.

The sum of the maximum allowable memory resources for requesters at level 0 belonging to one of the departments may be greater than the maximum allowable memory resource for that department at level 1. Similarly, the sum of the maximum allowable memory resources at level 1 for all of the departments may be greater than the maximum allowable memory resource at level 2.

The following pseudo code implements a system for managing resources, such as buffers or a memory as described above. This pseudo code requires a policy where the minimum resource is guaranteed.

Level 0: connection with "i" connections competing at this level
Level 1: service classes with "j" service classes competing level . . .
Level N: physical link with no competition above this level In the basic scenario, an entity requests resources and competes against other entities within a level for resources. In the following definitions, the "n" variable refers to the level, and the "c" variable refers to which peer entity at the level is requesting resources at the next higher level.

Min_Limit (n,c): Limits the number of "minimum" type resource the entity can use. It is used to assure that every entity gets its Minimum_Guaranteed amount of the resource.

AboveMin_Limit (n,c): Limits the number of "above-minimum" type resource the entity can use. The Maximum_Allowed number of resource an entity can use is equal to the sum of the Min_Limit and the AboveMin_Limit.

Min_Counter (n,c): Counts the number of resources in use by an entity until the Min_Limit has been reached.

AboveMin_Counter (n,c): Counts the number of resources in-use by an entity after the Min_Limit has been reached.

Enqueuing (consume resource)

```
IF (((Min_Counter(0,i) < Min_Limit(0,i)) OR
    ((AboveMin_Counter (0,i) < Above-Min_Limit (0,i)) AND
    (AboveMin_Counter (1,j) < AboveMin_Limit (1,j) AND
    . . .
    (AboveMin_Counter (N) < AboveMin_Limit(N)))
THEN{
    Take Resource
    IF (Min_Counter(0,i) < Min_Limit(0,i))
        THEN {
            Increment Min-Counter(0, i)
        } ELSE {
            Increment AboveMin_Counter(0,i)
            Increment AboveMin_Counter(1,j)
            . . .
            Increment AboveMin_Counter (N)
        }
} ELSE {
    No_Action (resource denied)
}
```

Free Resource:

```
Return Resource
IF (AboveMin_Counter (0,i) > 0)
    THEN Decrement AboveMin_Counter(0,i)
        Decrement AboveMin_Counter(i,j)
        . . .
        Decrement Min_Counter(N)
    } ELSE {
        Decrement Min_Counter(0,i)
    }
```

The pseudo code provides management of resources such as buffers, bandwidth, channels and memory according to the method illustrated in FIGS. 3 and 4. Referring now to buffers for purposes of illustration, in enqueuing the first IF statement (IF (((Min_Counter(0,i)<Min_Limit(0,i)) OR ) determines if the buffer usage by the level 0 entity is less than Min_Provided. If buffer usage is below Minimum_Guaranteed then a buffer is granted, otherwise a buffer is granted only if buffer usage at each intervening level is less than Maximum_Allowed. The IF statements following the logical OR (IF((AboveMin_Counter (0,i)<AboveMin_Limit (0,i)) AND (AboveMin_Counter (1,j)<AboveMin_Limit (1,j) AND . . . (AboveMin_Counter (N)<AboveMin_Limit(N)))) determine whether buffer usage by each intervening level is less than Maximum_Allowed. If buffer usage by an intervening level is not less than Maximum_Allowed then the request for a buffer is denied. When a buffer is granted the counters at level 0 and each intervening level are updated accordingly by the IF-THEN-ELSE statements. In dequeuing the AboveMin_Counter is tested at each level and is decremented if greater than zero, otherwise the Min_Counter is decremented.

The Minimum_Guaranteed and Maximum_Allowed variables may be assigned to entities in accordance with specified management policies. For example, an entity could be charged for resource use based on the values of the assigned Minimum_Guaranteed and Maximum_Allowed variables. Further, variables may be assigned in such a way as to allow a theoretical possibility of over-allocation of resources and thereby violate the basic rules of the management system. For example, if the total Minimum_Guaranteed resources at level 0 for all level 0 entities exceeds the Minimum_Guaranteed resources for the level 1 entity, a level 0 entity might possibly be unable to obtain its Minimum_Guaranteed resource level, e.g., if each level 0 entity demands Minimum_Guaranteed and the level 1 entity is reduced to Minimum_Guaranteed due to competition. Such over allocation may be done by the user of the management system in accordance with a policy decision or according to statistical data indicating the unlikely occurrence of each level 0 entity simultaneously demanding Minimum_Guaranteed.

The pseudo code above is directed toward a resource management system wherein a predetermined policy assures that the total Minimum_Guaranteed available at one level is equal to the sum of all the Minimum_Guaranteed resources at the level below. The pseudo code thus requires a Min_Counter/Limit only at level 0. If statistical resource sharing is used then the intervening levels may also be assigned a Min_Counter/Limit. Further, the resource management system may be operated without assigning any Minimum_Guaranteed variables. For example, Maximum_Allowed variables could be assigned to one or more entities such that the system operates to deny a request for a resource unit if any entity from level 0 to level N is not below Maximum_Allowed, without regard for assuring minimum resource allocation.

The following table shows an exemplary resource management policy:

TABLE 1

| Level | Num-Entities | Min_Limit /entity | Sum of Min_Limits | AboveMin_ Limit/entity | Sum of AboveMin _Limits |
|---|---|---|---|---|---|
| 0 | 10 | 2 | 20 | 10 | 100 |
| 1 | 10 | 20 | 200 | 60 | 600 |
| 2 | 10 | 200 | 2000 | 500 | 5000 |
| 3 | 1 | 2000 | n/a | 4000 | n/a |

The difference between the "Sum of Min_Limits" at a lower level and the Min_Limit/entity of the next level illustrates the policy which ensures that each level 0 entity is provided with the assigned Min_Provided allocation, i.e., the sum of Min_Limits at a lower level is less than or equal to the Min_Limit of the entity at the next higher level.

It should be noted however that Table 1 is a simplified example because the Min_Limit and the AboveMin_Limit are the same for all entities at a given level, and the number of entities are the same at each level. Typically, the limits would be different for each entity at each level, and the number of entities at each level would decrease at each increasing level of the hierarchy. A lower cost implementation could employ a restriction such that all of the limits of a particular entity would have the same value. Such a restriction would obviate the requirement of a per-entity limit storage location. The limits could then be kept on a per level basis for example.

Under some circumstances it may be desirable to statistically share the Minimum Guaranteed resources. For example, statistical sharing would be advantageous in a system having numerous resource users which will not simultaneously request resources. Table 2 illustrates an exemplary resource management policy where statistical sharing of the minimum guaranteed resource is employed. It will be appreciated that if every level 0 entity were to simultaneously request resources, the sum of the requested minimum resources (200) could not be provided by a level 1 entity (180).

TABLE 2

| Level | Num-Entities | Min_Limit /entity | Sum of Min_Limits | AboveMin_ Limit/entity | Sum of AboveMin _Limits |
|---|---|---|---|---|---|
| 0 | 10 | 2 | 20 | 10 | 100 |
| 1 | 10 | 18 | 180 | 60 | 600 |
| 2 | 10 | 144 | 1440 | 500 | 5000 |
| 3 | 1 | 864 | n/a | 4000 | n/a |

When the Minimum_Guaranteed portion is going to be statistically shared, then the pseudocode is modified as follows:

Consume Resource

```
IF (((Min_Counter(0,i) < Min_Limit(0,i)) AND
    ((Min_Counter(1,j) < Min_Limit(1,j)) OR
        (AboveMin_Counter (1,j) < AboveMin_Limit(1,j)))AND
    . . .
    ((Min_Counter(N) < Min_Limit(N)) OR
        (AboveMin_Counter(N) < AboveMin_Limit(N))))
THEN {
    Take Resource
        IF (Min_Counter(0,i) < Min_Limit(0,i)
            THEN {
                Increment Min_Counter(0,i)
            }
        IF (Min_Counter(1,j) < Min_Limit(1,j)
            THEN {
                Increment Min_Counter(1,j)
            } ELSE {
                Increment Min_Counter(1,j)
            }
        . . . . .
        IF(Min_Counter (N) < Min_Limit(N))
            THEN {
                Increment Min_Counter(N)
            } ELSE {
                Increment AboveMin_Counter(N)
            }
    }
ELSE IF ((AboveMin_Counter(0,i) < AboveMin_Limit(0,i)) AND
    ((Min_Counter(1,j) < Min_Limit(1,j)) AND
        AboveMin_Counter(1,j) < AboveMin_Limit(1,j))) AND
    . . . .
    ((Min_Counter(N) < Min_Limit(N)) AND
        (AboveMin_Counter(N) < AboveMin Limit (N))))
THEN {
    Take Resource
    Increment AboveMin_Counter(0,i)
    Increment AboveMin_Counter(1,j)
    . . . . .
    Increment AboveMin_Counter(N)
    }
ELSE {
    No_Action (resource denied)
    }
Free Resource:
Return Resource
IF (AboveMin_Counter(0,i)>0)
    THEN {
        Decrement AboveMin_Counter(0,i)
    } ELSE {
        Decrement Min_Counter(0,i)
    }
```

-continued

```
IF (AboveMin_Counter(1,j)>0)
    THEN {
        Decrement AboveMin_Counter(1,j)
    } ELSE {
        Decrement Min_Counter(1,j)
    }
    . . . . .
IF (AboveMin_Counter(N) >0)
    THEN {
        Decrement AboveMin_Counter(N)
    } ELSE {
        Decrement Min_Counter(N)
    }
}
```

The pseudocode allows statistical sharing policies for resource usage below the minimum guaranteed. Unlike the earlier described pseudocode, this pseudocode requires a Min_Limit and Min_Counter for each entity at each level. If the level 0 entity is below the associated Minimum_Guaranteed resource allocation, then the level 0 entity may use resources above the Minimum_Guaranteed allocations at higher levels. This policy allows entities to continue using resources even if the Minimum_Guaranteed pool at a higher level in the hierarchy has been consumed. Additionally, if actual use by the level 0 entity is above the Minimum_Guaranteed allocation, the resource will only be granted if there are "Minimum_Guaranteed" resources at all higher levels, i.e., the Min_Counter must be less than the Min_Limit for each higher level entity. This policy leaves resources available for other entities that have not consumed their minimum.

The Min_Limit at level N is optional. Min_Limit(N) controls the point at which requests for resources above the "Minimum_Guaranteed" pool are denied. Without control at level N, the "Maximum_Allowed" denial point is equal to the sum of the Min_Limits at the level below. The change to the pseudocode for such an implementation is to remove the (Min_Counter(N)<Min_Limit(N)) comparisons in the conditional statements.

The techniques described above are equally applicable to management of hierarchical resources other than bandwidth, and may be generalized with entities other than departments, groups, companies, etc. It should therefore be understood that the invention is not limited to the particular embodiments shown and described herein, and that various changes and modifications may be made without departing from the spirit and scope of this novel concept as defined by the following claims.

What is claimed is:

1. A method of hierarchical resource management for allocation of resource units to a level 0 entity through level 1 to level N entities including intervening levels, where N is greater than or equal to two, comprising:
   assigning a first variable for at least one entity specifying a maximum resource allocation for the respective entity;
   receiving a request from a level 0 entity for a resource unit; and
   in response to a request from a level 0 entity for a resource unit, allocating said resource unit to the level 0 entity if:
   a) actual resource utilization by said level 0 entity is less than the maximum resource allocation specified by the respective first variable; and
   b) actual resource utilization by each of said level 1 through level N-1 entities is less than the maximum resource allocation specified by the respective first variable for each of said entities.

2. The method of hierarchical resource management of claim 1 wherein said method further includes the step of assigning a second variable for at least one entity, said second variable specifying a minimum resource allocation for the respective entity to which the second variable is assigned.

3. The method of hierarchical resource management of claim 1 including the further step of employing the method to manage a storage resource.

4. The method of hierarchical resource management of claim 3 including the further step of employing the method to manage memory.

5. The method of hierarchical resource management of claim 4 including the further step of employing the method to manage buffers in a telecommunications network.

6. The method of hierarchical resource management of claim 4 including the further step of employing the method to manage memory for storing ATM cells.

7. The method of hierarchical resource management of claim 1 including the further step of employing the method to manage channels.

8. A method of hierarchical resource management for allocating resource units to a level 0 entity through entities at levels 1 to N including intervening levels, where N is greater than or equal to two, comprising the steps of:
   assigning a first variable for at least one entity specifying a maximum resource allocation for the respective entity;
   assigning a second variable for at least one entity specifying a minimum resource allocation for the respective entity;
   receiving a request from a level 0 entity for a resource unit; and
   in response to a request from a level 0 entity for a resource unit, allocating said resource unit to the level 0 entity if actual resource utilization is less than the resource allocation specified by the respective second variable, and allocating said resource unit to the level 0 entity if:
   a) actual resource utilization by said level 0 entity is less than the maximum resource allocation specified by the respective first variable; and
   b) actual resource utilization by each of said level 1 through said level N-1 entities is less than the maximum resource allocation specified by the respective first variable for each of said entities.

9. A method of hierarchical resource management for allocation of resource units to a level 0 entity through level 1 to level N entities including intervening levels, where N is greater than or equal to two, comprising the steps of:
   assigning a first variable for at least one entity specifying a maximum resource allocation for the respective entity;
   assigning a second variable for at least one entity specifying a minimum resource allocation for the respective entity;
   receiving a request from a level 0 entity for a resource unit; and
   in response to a request from a level 0 entity for a resource unit:
   a) allocating said resource unit to the level 0 entity provided actual resource utilization by the level 0 entity is less than the minimum resource utilization specified by the second variable, said resource unit being granted without regard to any resultant resource utilization in excess of that specified by the respective second variable at levels 1 through N; and b) allocating said resource unit to the level 0 entity provided actual resource utilization by the level 0 entity is greater than the minimum allocation specified by the second variable, and provided resultant actual resource utilization at each of levels 1 through N will be less than the minimum resource utilization specified by the respective second variable.

10. The method of hierarchical resource management of claim 9 including the further step of employing the method to manage a storage resource.

11. The method of hierarchical resource management of claim 10 including the further step of employing the method to manage memory.

12. The method of hierarchical resource management of claim 11 including the further step of employing the method to manage buffers in a telecommunications network.

13. The method of hierarchical resource management of claim 11 including the further step of employing the method to manage memory for storing ATM cells.

* * * * *